J. ZINK.
SEAT.
APPLICATION FILED AUG. 2, 1915.
1,179,598.
Patented Apr. 18, 1916.
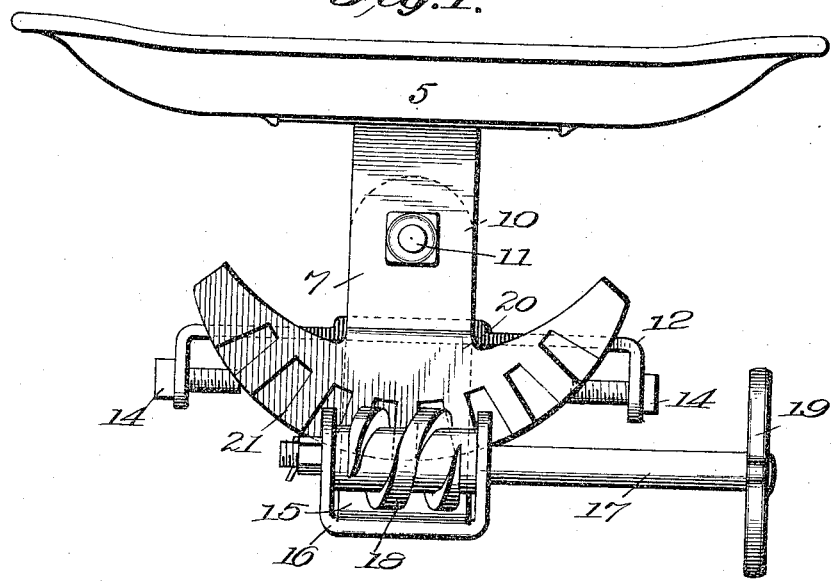
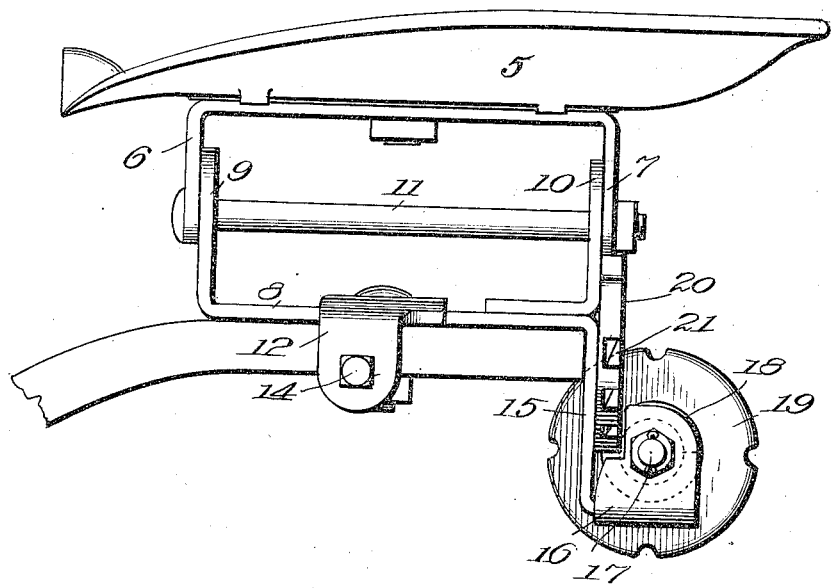
Inventor
John Zink
By Max A. Schmidt
Attorney

UNITED STATES PATENT OFFICE.

JOHN ZINK, OF UMATILLA COUNTY, OREGON.

SEAT.

1,179,598.

Specification of Letters Patent. Patented Apr. 18, 1916.

Application filed August 2, 1915. Serial No. 43,187.

*To all whom it may concern:*

Be it known that I, JOHN ZINK, a citizen of the United States, residing in the county of Umatilla and State of Oregon, have invented certain new and useful Improvements in Seats, of which the following is a specification.

This invention relates to seats for riding plows, cultivators and other farming implements and machinery, and its object is to provide a novel and improved supporting means for the seat, whereby it may be adjusted to ride horizontally when the machine is traveling on the side of a hill.

In order that the invention may be better understood, reference is had to the accompanying drawing, in which—

Figure 1 is a rear end view of the seat and its supporting means, and Fig. 2 is a side elevation thereof.

Referring specifically to the drawing, 5 denotes the seat, proper, the same being carried by a yoke which is pivotally connected to a bracket attached to the frame of the machine. The yoke is securely fastened to the under side of the seat, and has front and rear depending branches 6 and 7, respectively. The bracket comprises a base member 8 having front and rear upstanding ears 9 and 10, respectively. The yoke branches and the bracket ears are connected by a pivot bolt 11, which provides a pivotal support for the seat. The pivot bolt extends in the direction of the length of the machine, and the seat may therefore be tilted sidewise. The ear 9 is integral with the member 8, and the ear 10 is separate from said member and bolted or otherwise fastened thereto.

Intermediate its ends, the base member 8 carries a transverse arm 12, whereby the bracket is mounted on the machine. The arm extends outward from opposite sides of the member 8, and has downturned outer ends carrying screws 14 or other suitable fasteners for connection to the frame of the machine, or the usual spring support shown in Fig. 2.

The rear end of the base member 8 has a depending bracket arm 15 carrying, at its lower end, bearings 16 in which is journaled a shaft 17 having a worm 18, the shaft being provided with a hand wheel or other suitable operating means 19. The rear yoke branch 7 has a downturned extension 20 provided with a toothed sector 21 which is in mesh with the worm 18. The sector is located between the worm and the arm 15, and the latter therefore takes up the side thrust against the sector.

The hand wheel 19 is located alongside the seat 5, at the rear thereof, and it is within easy reach of the occupant of the seat, and by turning the shaft 17 by means of said hand wheel, the seat may be tilted sidewise through the worm 18 and the sector 21. The seat can therefore be readily leveled sidewise and kept horizontally when the machine is on the side of a hill, and this can be done without the occupant leaving the seat.

I claim:

1. The combination of a seat, a yoke mounted on the bottom of the seat and having depending branches, one of said branches having a downward extension provided with a toothed sector, a supporting bracket for the seat, said bracket having upstanding ears, a pivot bolt passing through said ears and the yoke branches, an arm depending from the bracket, bearings carried by said arm, a shaft supported in said bearings, and a worm on the shaft and meshing with the sector.

2. The combination of a seat, a yoke mounted on the bottom of the seat and having depending branches, one of said branches having a downward extension provided with a toothed sector, a supporting bracket for the seat, said bracket having upstanding ears, a pivot bolt passing through said ears and the yoke branches, an arm depending from the bracket, bearings carried by the arm, a shaft supported in said bearings, and a worm on the shaft and meshing with the sector, said sector being located between the worm and the aforesaid arm, and having its rear face in engagement with the arm.

In testimony whereof I affix my signature in the presence of two witnesses.

JOHN ZINK.

Witnesses:
 E. D. MATTINSON,
 E. E. SAUZE.

Copies of this patent may be obtained for five cents each, by addressing the "Commissioner of Patents, Washington, D. C."